United States Patent
Moritomi et al.

(10) Patent No.: US 6,469,077 B1
(45) Date of Patent: Oct. 22, 2002

(54) POLYPHENYLENE ETHER RESIN COMPOSITION

(75) Inventors: Satoru Moritomi, Sodegaura (JP); Yasuo Tatsumi, Itami (JP)

(73) Assignees: Sumitomo Chemical Company Limited, Osaka (JP); Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 09/416,892

(22) Filed: Oct. 13, 1999

(30) Foreign Application Priority Data

Oct. 13, 1998 (JP) .............................. 10-290621

(51) Int. Cl.⁷ ......................... C08K 5/521; C08K 5/524
(52) U.S. Cl. ...................................... 524/127; 524/145
(58) Field of Search ................... 524/127, 145

(56) References Cited

U.S. PATENT DOCUMENTS

| | | |
|---|---|---|
| 4,107,232 A | 8/1978 | Haaf |
| 4,332,714 A | 6/1982 | Haag |
| 4,355,126 A | 10/1982 | Haaf |
| 5,169,887 A | 12/1992 | Snow |
| 5,206,276 A | 4/1993 | Lee |
| 5,294,655 A | 3/1994 | Lee, Jr. |
| 5,455,292 A * | 10/1995 | Kakegawa et al. |
| 5,741,838 A * | 4/1998 | Fuhr et al. ................ 524/127 |
| 6,083,428 A * | 7/2000 | Ueda et al. ................ 524/127 |

FOREIGN PATENT DOCUMENTS

| | | | |
|---|---|---|---|
| EP | 521628 * | 1/1993 | ............... 524/127 |
| EP | 829521 | 3/1993 | |
| EP | 767204 | 4/1997 | |
| GB | 2294934 | 5/1996 | |
| JP | 57-207641 | 12/1982 | |
| JP | 57-207642 | 12/1982 | |
| JP | 59-202240 | 11/1984 | |

* cited by examiner

Primary Examiner—Peter Szekely
(74) Attorney, Agent, or Firm—Birch, Stewart, Kolasch & Birch, LLP

(57) ABSTRACT

There is provided a polyphenylene ether resin composition, comprising:
  a component (A) containing a polyphenylene ether resin;
  a component (B) containing a phosphate compound represented by the following formula (I); and
  a component (C) containing a condensed phosphate compound represented by the following formula (II),

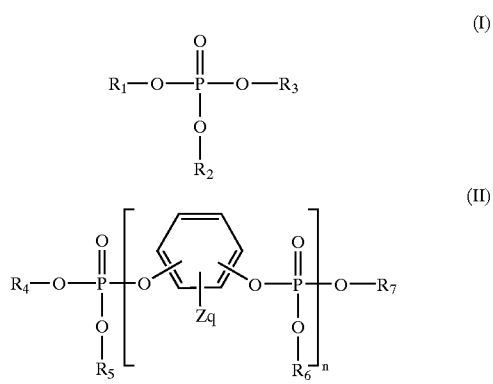

wherein $R_1$, $R_2$ and $R_3$ are independently of one another an alkyl group having 1 to 20 carbon atoms, a cycloalkyl group having 3 to 20 carbon atoms, an aryl group having 6 to 20 carbon atoms, an alkoxy group having 1 to 20 carbon atoms or a hydroxyl group; $R_4$, $R_5$, $R_6$ and $R_7$ are independently of one another a hydrogen atom, an alkyl group having 1 to 20 carbon atoms, a cycloalkyl group having 6 to 20 carbon atoms, an aryl group having 6 to 20 carbon atoms, an alkoxy group having 1 to 20 carbon atoms or a hydroxyl group, provided that a case of $R_4=R_5=R_6=R=H$ is excluded; n is an integer of not less than 1; Z is an organic group having 1 to 10 carbon atoms; and q is an integer of from 0 to 4; and wherein said composition contains a content of phosphorus therein of from about 1.8 to 5% by weight based on the total weight of the polyphenylene ether resin composition.

12 Claims, No Drawings

POLYPHENYLENE ETHER RESIN COMPOSITION

FIELD OF THE INVENTION

The present invention relates to a polyphenylene ether resin composition. More specifically, the present invention relates to a polyphenylene ether resin composition having superior heat resistance and flame resistance, and wherein the flame resistance is remarkable when the resin composition is formed into a thin molded product.

BACKGROUND OF THE INVENTION

Polyphenylene ether resins are superior in their mechanical properties, electric properties, heat resistance, hydrolysis resistance and dimensional stability, and are extensively used as thermoplastic engineering plastic resins.

As a technique of imparting flame resistance to polyphenylene ether resins, there is known a composition comprising a polyphenylene ether resin and a phosphate flame retardant. For example, Japanese Patent Application Kokai (JP-A) No. 57-207641 discloses a flame resisting polyphenylene ether resin composition comprising a polyphenylene ether resin, a triphenyl phosphate and a polyphosphate, and teaches therein that a total amount of both the phosphates is preferably from 3 to 15% by weight based on the total amount of the polyphenylene ether resin and both the phosphates. Further, EP0767204-A discloses a flame resisting polyphenylene ether resin composition comprising a polyphenylene ether resin, a bisphenol A type condensed phosphate and a monophosphate.

Each of the references referred to above is incorporated herein by reference in its entirety.

However, the composition disclosed in JP-A 57-207641 possesses a problem in that when the composition is formed into a thin molded product such as an insulating sheet suitably used for electric and electronic parts, its flame resistance is not sufficient. Similarly, the composition disclosed in EP 0767204-A possesses a problem that makes it necessary to use a large amount of the bisphenol A type condensed phosphate in order to obtain a satisfactory flame resistance (because the content of phosphorus in the bisphenol A type condensed phosphate is low). As such, the heat resistance of the resin composition obtained is made insufficient, and therefore, it is difficult to obtain a resin composition that is well-balanced both in flame resistance and heat resistance.

SUMMARY OF THE INVENTION

Accordingly, an object of the present invention is to provide a polyphenylene ether resin composition that is superior both in its heat resistance and its flame resistance, particularly in the flame resistance of a thin molded product obtained therefrom. In thepresent invention, the term "thin molded product" is understood to mean a molded product having a thickness of usually not more than about 1 mm.

The present inventors have undertaken extensive studies with respect to studying the heat resistance and flame resistance of polyphenylene ether resin compositions. As a result, it has been found that a resin composition comprising a polyphenylene ether resin and two specific kinds of phosphorus-containing compounds can answer the object mentioned above, and thereby the present invention has been obtained.

The present invention provides a polyphenylene ether resin composition, comprising:

a component (A) containing a polyphenylene ether resin;

a component (B) containing a phosphate compound represented by the following,formula (I); and a component (C) containing a condensed phosphate compound represented by the following formula (II),

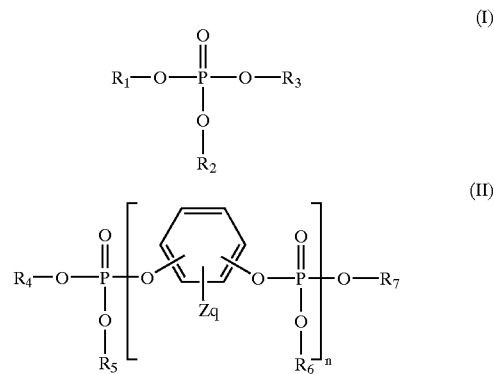

wherein $R_1$, $R_2$ and $R_3$ are independently of one another an alkyl group having 1 to 20 carbon atoms, a cycloalkyl group having 3 to 20 carbon atoms, an aryl group having 6 to 20 carbon atoms, an alkoxy group having 1 to 20 carbon atoms or a hydroxyl group; $R_4$, $R_5$, $R_6$ and $R_7$ are independently of one another a hydrogen atom, an alkyl group having 1 to 20 carbon atoms, a cycloalkyl group having 6 to 20 carbon atoms, an aryl group having 6 to 20 carbon atoms, an alkoxy group having 1 to 20 carbon atoms or a hydroxyl group, provided that a case of $R_4=R_5=R_6=R_7=H$ is excluded; n is an integer of not less than 1; Z is an organic group having 1 to 10 carbon atoms; and q is an integer of from 0 to 4; and wherein said composition contains a content of phosphorus therein of from about 1.8 to 5% by weight based on the total weight of the polyphenylene ether resin composition.

The present invention further provides a thin molded product obtained from the polyphenylene ether resin composition as mentioned above and provides an insulating sheet of the thin molded product.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The component (A), that is, the polyphenylene ether resin used in the present invention, is a homopolymer resin or a copolymer resin obtained by oxidatively polymerizing at least one phenol compound represented by the following formula (III) with oxygen or an oxygen-containing gas with the aid of an oxydative coupling catalyst,

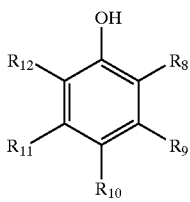

(III)

wherein $R_8$, $R_9$, $R_{10}$, $R_{11}$ and $R_{12}$ are independently of one another a hydrogen atom, a halogen atom, a hydrocarbon group or substituted hydrocarbon group, provided that at least one of them is always a hydrogen atom.

Examples of $R_8$, $R_9$, $R_{10}$, $R_{11}$ and $R_{12}$ in the formula (III) are hydrogen, chlorine, bromine, fluorine, iodine, methyl, ethyl, n- or iso-propyl, pri-, sec- or t-butyl, hydroxyethyl, phenylethyl, benzyl, hydroxymethyl, carboxyethyl, methoxycarbonylethyl, cyanoethyl, phenyl, methylphenyl, dimethylphenyl, ethylphenyl and allyl.

Examples of the phenol compound represented by the formula (III) are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol. Among these phenol compounds, 2,6-dimethylphenol, 2,6-diphenylphenol, 3-methyl-6-t-butylphenol and 2,3,6-trimethylphenol are preferred.

The phenol compound represented by the formula (III) may be copolymerized with a polyhydric aromatic compound such as bisphenol-A, resorcinol, hydroquinone and novolak resins to prepare a copolymer. In the present invention, the copolymer may be also used as the polyphenylene ether resin according to the present invention.

The oxidative coupling catalyst used for the oxidative (co)polymerization of said phenol compound is not particularly limited, and any catalyst having a polymerizing ability can be used.

As a process for oxidatively (co)polymerizing the phenol compound to produce the polyphenylene ether resin, there are exemplified those disclosed in, for example, U.S. Pat. Nos. 3,306,874, 3,306,875 and 3,257,357, Japanese Patent Publication (JP-B) No. 52-17880, Japanese Patent Application Kokai (JP-A) Nos. 50-51197 and 1-304119. Each of the references referred to above is incorporated herein by reference in its entirety.

Specific examples of the polyphenylene ether resin used in the present invention are poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dibutyl-1,4-phenylene ether), poly(2,6-dipropenyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(3-methyl-6-t-butyl-1,4-phenylene ether), poly(2,6-dibenzyl-1,4-phenylene ether) and copolymers of every description containing a number of the repeating units constituting the above-exemplified resins.

Further, a copolymer of a multi-substituted phenol such as 2,3,6-trimethylphenol and 2,3,5,6-tetramethylphenol with a 2-substituted phenol such as 2,6-dimethylphenol may be also used as the polyphenylene ether resin according to the present invention.

Among the polyphenylene ether resins exemplified above, preferred are poly(2,6-dimethyl-1,4-phenylene ether) and a copolymer of 2,6-dimethylphenol with 2,3,6-trimethylphenol.

The polyphenylene ether resin used in the present invention may be a graft copolymer obtained by grafting the above-mentioned (co)polymer with a styrene compound such as styrene, α-methylstyrene, p-methylstyrene and vinylstyrene, and such a graft copolymer may be also used as the polyphenylene ether resin according to the present invention.

With respect to the polyphenylene ether resin used in the present invention, those having an intrinsic viscosity of from about 0.3 to 0.7 dl/g, preferably from about 0.36 to 0.65 dl/g, more preferably from about 0.40 to 0.6 dl/g, measured in chloroform of 30° C. are preferred. When the intrinsic viscosity is too low, it may be difficult to attain no-dripping at the time of combustion, and when it is too high, the polyphenylene ether resin composition in accordance with the present invention may be deteriorated in its molding processability. Here, what is meant by the term "no-dripping" is that a sample in the course of burning is not observed to drip in a flame resistance test, that is, a UL 94 vertical combustion test.

With respect to the phosphate compound contained in the component (B) used in the present invention, the symbols, $R_1$, $R_2$ and $R_3$ in the formula (I) stand for independently of one another an alkyl group having 1 to 20 carbon atoms, a cycloalkyl group having 3 to 20 carbon atoms, an aryl group having 6 to 20 carbon atoms, an alkoxy group having 1 to 20 carbon atoms or a hydroxyl group, wherein the aryl group is preferred. These groups mentioned above, excluding the hydroxyl group, may have a substituent. Examples of such substituents are alkyl, cycloalkyl, aryl, alkoxy and hydroxyl groups.

There are exemplified as $R_1$, $R_2$ and $R_3$, besides the hydroxyl group, methyl, ethyl, propyl, butyl, pentyl, octyl, dodecyl, ethylhexyl, trimethylhexyl, cyclopropyl, cyclopentyl, cyclohexyl, phenyl, tolyl, xylyl, nonylphenyl, naphthyl and butoxyethyl groups. Of these, phenyl and tolyl groups are preferred.

Examples of the phosphate compound contained in the component (B) are trimethyl phosphate, triethyl phosphate, tributyl phosphate, trioctyl phosphate, tributoxyethyl phosphate, phenyl bisdodecyl phosphate, phenyl bisneopentyl phosphate, phenyl bis(3,5,5-trimethylhexyl)phosphate, ethyl diphenyl phosphate, bis(2-ethylhexyl) (p-tolyl) phosphate, tritolyl phosphate, bis(2-ethylhexyl)phenyl phosphate, tri(nonylphenyl)phosphate, triphenyl phosphate, diphenyl tolyl phosphate, dibutyl phenyl phosphate, p-tolyl bis (2,5,5-trimethylhexyl)phosphate, and 2-ethylhexyl diphenyl phosphate. Of these, preferred are triphenyl phosphate, diphenyl tolyl phosphate, tritolyl phosphate and other organic phosphates of the formula (I) wherein $R_1$, $R_2$ and $R_3$ are all aryl groups.

With respect to the condensed phosphate compound contained in the component (C) used in the present invention, the symbols, $R_4$, $R_5$, $R_6$ and $R_7$ in the formula (II) stand for independently of one another a hydrogen atom, an alkyl group having 1 to 20 carbon atoms, a cycloalkyl group having 6 to 20 carbon atoms, an aryl group having 6 to 20 carbon atoms, an alkoxy group having 1 to 20 carbon atoms or a hydroxyl group, provided that a case where all are hydrogen atoms at the same time is excluded. These groups, excluding a hydrogen atom and a hydroxyl group, may have a substituent, and examples of the substituent are alkyl, alkoxy, alkylthio, aryl, aryloxy and arylthio groups, and those groups formed by combining these substituents such as, for example, an arylalkoxyalkyl group, and those groups formed by binding these substituents through an atom such as oxygen, sulfur and nitrogen, such as, for example, an arylsulfonylaryl group. Preferred examples of $R_4, R_5, R_6$ and $R_7$ are aryl groups such as phenyl, tolyl and xylyl.

The symbol Z stands for an organic group having 1 to 10 carbon atoms. Examples of the organic group are alkyl, alkoxy, alkylthio, aryl, aryloxy and arylthio groups, and specific examples thereof are methyl, ethyl, propyl, methylthio, ethylthio, methoxy, ethoxy, phenyl, tolyl, xylyl, phenoxy, benzyloxy and phenythio groups. The symbol q stands for an integer of from 0 to 4, preferably 0.

Specific examples of the condensed phosphate compound contained in the component (C) are hydroquinone bisdiphenyl phosphate, hydroquinone bisdicresyl phosphate, hydroquinone bisdixylyl phosphate, resorcinol bisdiphenyl phosphate, resorcinol bisdixylyl phosphate, and hydroquinone bisdixylyl phosphate.

With respect to proportions of respective components constituting the polyphenylene ether resin composition in accordance with the present invention, a proportion of the component (A) may be from about 20 to 85% by weight, preferably from about 40 to 85% by weight, based on the total weight of the polyphenylene ether resin composition, which may comprise other components in addition to the components (A), (B) and (C). When the amount of the component (A) is too high, the polyphenylene ether resin composition obtained may become inferior in its flowability at the time of melting, and when the amount of the component (A) is too low, the polyphenylene ether resin composition obtained may become insufficient in its heat resistance.

The components (B) and (C) are used in proportions such that the content of phosphorus is made to be from about 1.8 to 5% by weight, preferably from about 2 to 4% by weight, based on the total weight of the polyphenylene ether resin composition. This can mean in general that a proportion of the component (B) is from about 1 to 50% by weight, preferably from about 1 to 40% by weight, based on the total weight of the polyphenylene ether resin composition, and that of the component (C) is from about 1 to 50% by weight, preferably from about 1 to 40% by weight, based thereon. When the components (B) and (C) are present in too high of an amount, the polyphenylene ether resin composition obtained may become insufficient in its heat resistance, and when they are present in too low of an amount, the polyphenylene ether resin composition obtained may become insufficient in its flame resistance.

In the present invention, both the component (B) and the component (C) are used in combination. For example, while it is true that a polyphenylene ether resin composition obtained using no component (C) can attain a reduction in a combustion time, nonetheless its dripping property is deteriorated, and therefore, it is impossible to meet with a flame resistance of V-0 in a UL-94 test using a thin molded product of less than about 1 mm in thickness obtained from the resin composition. Similarly, whereas, a polyphenylene ether resin composition obtained using no component (B) is superior in its dripping property, nonetheless a reduction in a combustion time cannot be obtained, and therefore it is impossible to meet with a flame resistance of V-0 in a UL-94 test using a molded product of less than about 1 mm in thickness obtained from the resin composition.

A weight ratio between the component (B) and the component (C) in the polyphenylene ether resin composition in accordance with the present invention is preferably from about 99/1 to 1/99, more preferably from about 90/10 to 10/90, much more preferably from about 80/20 to 20/80. When the ratio is outside this range, a thin molded product obtained from the present polyphenylene ether resin composition may become insufficient in its flame resistance.

The components (A), (B) and (C) constituting the polyphenylene ether resin composition in accordance with the present invention may be used in combination with other high molecular weight compounds and additives containing, for example, dyes, pigments, antistatic agents, anti-oxidants and weather resisting agents, in a way such that the objects and effects of the present invention are not impaired.

Examples of said other high molecular weight compounds are styrene based polymers such as polystyrene, high impact polystyrene and styrene-butadiene-styrene triblock copolymer; olefin polymers such as polypropylene, high density polyethylene, low density polyethylene, linear low density polyethylene, propylene-ethylene copolymer, ethylene-butene-1 copolymer, ethylene-pentene copolymer, ethylene-hexene copolymer and poly-4-methylpentene-1 copolymer; copolymers of olefins such as ethylene and propylene with vinyl monomers such as acrylates containing, for example, methyl acrylate and ethyl acrylate, methacrylates containing, for example, methyl methacrylate and ethyl methacrylate, vinyl acetate, styrene, acrylonitrile and glycidyl methacrylate; polymers such as polyvinyl chloride, poly(methyl methacrylate), polyvinyl acetate, polyvinyl pyridine, polyvinyl carbazole, polyacrylamide and polyacrylonitrile; high molecular weight compounds such as polycarbonate, polysulfone, polyether sulfone, polyethylene terephthalate, polybutylene terephthalate, polyarylene ester containing U polymer which is a trade name of Unitika Ltd., polyphenylene sulfide, polyamide such as 6-nylon, 6,6-nylon and 12-nylon and polyacetal; thermosetting resins such as polyimide, polyamidoimide, phenol resin, alkyd resin, unsaturated polyester resin and diallyl phthalate resin; silicone resins and fluororesins.

A process for producing the polyphenylene ether resin composition in accordance with the present invention is not particularly limited and may be any of those known. The process contains, for example, a solution-blending process and a melt-kneading process. Of these, a melt-kneading process is recommendable. There is exemplified a process wherein respective components mentioned above are blended in an optional order in a mixer such as a Henschell mixer and a ribbon blender, and the resulting mixture is melt-kneaded in a kneader such as a Banbury mixer, a Brabender plastograph and a single or twin screw extruder. A melt-kneading temperature is usually from about 150 to 400° C., preferably from about 200 to 350° C.

A process for producing a molded product of the polyphenylene ether resin composition in accordance with the present invention is not particularly limited and may be any of those known. Examples of the process for producing said molded product are an extrusion molding method, a calender molding method, an injection molding method and a blow molding method.

According to the present invention, there can be obtained a polyphenylene ether resin composition which is superior both in its heat resistance and its flame resistance and which comprises a polyphenylene ether resin and specific phosphorus-containing compounds of two kinds. The resin composition in accordance with the present invention can exhibit a superior flame resistance, particularly when formed into a thin molded product particularly such as a sheet, its thickness being less than about 0.5 mm, and its thermal deformation temperature being not lower than about 80° C. at a load of 1.81 MPa, and therefore the present resin composition can be applied most suitably for a thin molded product such as an insulating sheet for electric and electronic instruments and all sorts of films, where both flame resistance and insulation property are required.

EXAMPLE

The present invention is illustrated in more detail with reference to the following Examples, which are only illustrative, and are not limitative for the scope of the present invention.

Components used in Examples and Comparative Examples are as follows.

1. Polyphenylene Ether Resin (Component (A))

PPE: Poly(2,6-dimethyl-1,4-phenylene ether), its intrinsic viscosity measured in chloroform at 30° C. being 0.46 dl/g.

2. Phosphate Compound(Component (B))

P-1: Triphenyl phosphate produced by Daihachi Chemical Industry Co., its phosphorus content being 9.5% by weight.

3. Condensed Phosphate Compound

P-2: Resorcinol bisdiphenyl phosphate, a trade mark of CR733S, produced by Daihachi Chemical Industry Co., its phosphorus content being 10.7% by weight (component (C)).

P-3: Resorcinol bisdixylyl phosphate, a trade mark of PX200, produced by Daihachi Chemical Industry Co., its phosphorus content being 9.0% by weight (component (C))

P-4: Bisphenol A bisdiphenyl phosphate, a trade mark of CR741, produced by Daihachi Chemical Industry Co., its phosphorus content being 8.8% by weight (which does not satisfy the formula (II)).

4. Block Copolymer(Other Component)

SBS: Styrene-butadiene-styrene triblock copolymer, a trade mark of Cariflex TR1101, produced by Shell Chemical Co.

Evaluation methods of the physical properties are as follows.

1. Thermal Deformation Temperature

The thermal deformation temperature used as a measure for heat resistance was measured under a load of 1.81 MPa according to ASTM D648.

2. Flame Resistance

The polyphenylene ether resin composition was compression molded to obtain respective test pieces of 0.4 mm and 0.3 mm in thickness. Using the test pieces obtained, a UL-94 vertical combustion test was carried out. In the evaluation of flame resistance, what is meant by the term "not coming under" is that the burning period of time is more than that prescribed under the UL-94 vertical combustion test, or that the test piece burns to a clump, and the term also expresses an evaluation that is inferior to V-0, V-1 and V-2.

Examples 1 to 3

Respective components in their blending proportions as shown in Table 1 were fed in a continuous twin screw kneading machine (TEM-50 Type A manufactured by Toshiba Machine Co.) set at a cylinder temperature of 260° C. and a screw rotation of 200 rpm through a hopper equipped thereto, and melt-kneaded therein to obtain respective resin compositions in the form of pellets. The obtained pellets were compression molded at a temperature of 260° C., thereby obtaining test pieces of 0.4 mm and 0.3 mm in thickness, respectively, which were used for the evaluation.

Evaluation results thereof are as shown in Table 1.

Comparative Examples 1 to 4

Example 1 was repeated, except that respective components in their blending proportions as shown in Table 2 were used. Evaluation results are as shown in Table 2. Here, Comparative Example 1 shows an instance where no component (C) was used, so that the content of phosphorus became too low; Comparative Example 2 shows an instance where the content of phosphorus was within a scope of the present invention, but no component (C) was used; Comparative Example 3 shows an instance where the content of phosphorus was within a scope of the present invention, but no component (B) was used; and Comparative Example 4 shows an instance where the content of phosphorus was within a scope of the present invention, but P-4 which does not satisfy the formula (II) was used.

TABLE 1

| Example | 1 | 2 | 3 |
| --- | --- | --- | --- |
| Blending proportion (parts by weight) | | | |
| PPE (Component (A)) | 100 | 100 | 100 |
| SBS (Other component) | 3 | 11 | 0 |
| P-1 (Component (B)) | 8 | 7 | 6 |
| P-2 (Component (C)) | 19 | 21 | 0 |
| P-3 (Component (C)) | 0 | 0 | 22 |
| Phosphorus content (% by weight) | 2.2 | 2.1 | 2.0 |
| Evaluation results | | | |
| Thermal deformation temperature (° C.) | 102 | 94 | 117 |
| Flame resistance | | | |
| Thickness 0.4 mm | V-0 | V-0 | V-0 |
| Thickness 0.3 mm | V-0 | V-0 | V-0 |

TABLE 2

| Comparative Example | 1 | 2 | 3 | 4 |
| --- | --- | --- | --- | --- |
| Blending proportion (parts by weight) | | | | |
| PPE (Component (A)) | 100 | 100 | 100 | 100 |
| SBS (Other component) | 14 | 14 | 11 | 3 |
| P-1 (Component (B)) | 22 | 34 | 0 | 8 |
| P-2 (Component (C)) | 0 | 0 | 30 | 0 |
| P-4 | 0 | 0 | 0 | 19 |
| Phosphorus content (% by weight) | 1.5 | 2.2 | 2.2 | 1.9 |
| Evaluation results | | | | |
| Thermal deformation temperature (° C.) | 92 | 82 | 100 | 102 |

TABLE 2-continued

| Comparative Example | 1 | 2 | 3 | 4 |
|---|---|---|---|---|
| Flame resistance | | | | |
| Thickness 0.4 mm | V-2 | V-2 | NCU | — |
| Thickness 0.3 mm | NCU | NCU | NCU | NCU |

Note:
"NCU" stands for "not coming under"; meaning that the burning period of time is more than that prescribed under the UL-94 vertical combustion test, or that the test piece burns to a clump, and the term also expresses an evaluation that is inferior to V-0, V-1 and V-2.

What is claimed is:

1. A thin molded product obtained from a polyphenylene ether resin composition comprising:

a component (A) containing a polyphenylene ether resin;

a component (B) containing a phosphate compound represented by the following formula (I); and a component (C) containing a condensed phosphate compound represented by the following formula (II);

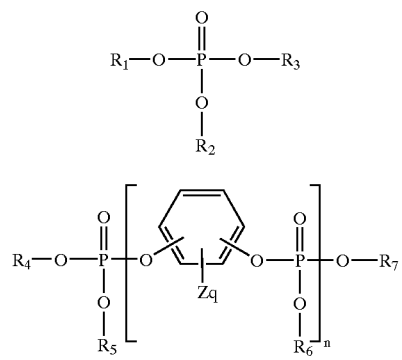

wherein $R_1$, $R_2$ and $R_3$ are independently of one another an alkyl group having 1 to 20 carbon atoms, a cycloalkyl group having 3 to 20 carbon atoms, or an aryl group having 6 to 20 carbon atoms, $R_4$, $R_5$, $R_6$ and $R_7$ are independently of one another a hydrogen atom, an alkyl group having 1 to 20 carbon atoms, a cycloalkyl group having 6 to 20 carbon atoms, or an aryl group having 6 to 20 carbon atoms, with the proviso that the compound of formula (II) can not be the compound where $R_4=R_5=R_6=R_7=H$; n is an integer of not less than 1; Z is an organic group having 1 to 10 carbon atoms; and q is an integer of from 0 to 4; wherein said composition contains a content of phosphorus therein of from about 1.8 to 5% by weight based on the total weight of the polyphenylene ether resin composition; and wherein the thin molded product has a thickness of less than about 0.5 mm.

2. The thin molded product according to claim 1, wherein the thin molded product has a thermal deformation temperature of not lower than about 80° C. at a load of 1.81 MPa, and wherein the thin molded product having a thickness of less than about 0.5 mm shows a flame resistance of V-0 in a UL-94 vertical combustion test.

3. An insulating sheet of a thin molded product obtained from a polyphenylene ether resin composition comprising:

a component (A) containing a polyphenylene ether resin;

a component (B) containing a phosphate compound represented by the following formula (I); and a component (C) containing a condensed phosphate compound represented by the following formula (II);

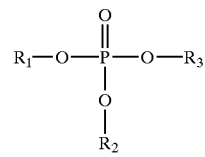

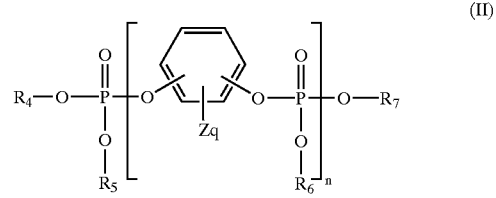

wherein $R_1$, $R_2$ and $R_3$ are independently of one another an alkyl group having 1 to 20 carbon atoms, a cycloalkyl group having 3 to 20 carbon atoms, or an aryl group having 6 to 20 carbon atoms, $R_4$, $R_5$, $R_6$ and $R_7$ are independently of one another a hydrogen atom, an alkyl group having 1 to 20 carbon atoms, a cycloalkyl group having 6 to 20 carbon atoms, or an aryl group having 6 to 20 carbon atoms, with the proviso that the compound of formula (II) can not be the compound where $R_4=R_5=R6=R_7=H$; n is an integer of not less than 1; Z is an organic group having 1 to 10 carbon atoms; and q is an integer of from 0 to 4; wherein said composition contains a content of phosphorus therein of from about 1.8 to 5% by weight based on the total weight of the polyphenylene ether resin composition; and wherein the thin molded product has a thickness of less than about 0.5 mm.

4. The insulating sheet according to claim 3, wherein $R_1$, $R_2$ and $R_3$ are independently of one another a phenyl group or a tolyl group, $R_4$, $R_5$, $R_6$ and $R_7$ are independently of one another a phenyl group, a tolyl group or a xylyl group, and q is 0.

5. The insulating sheet according to claim 3, wherein the thin molded product has a thermal deformation temperature of not lower than about 80° C. at a load of 1.81 MPa, and wherein the thin molded product having a thickness of less than about 0.5 mm shows a flame resistance of V-O in a UL-94 vertical combustion test.

6. The insulating sheet according to claim 3, wherein the polyphenylene ether resin contained in the component (A) is poly(2,6-dimethyl-1,4-phenylene ether) or a copolymer of 2,6-dimethylphenol with 2,3,6-trimethylphenol.

7. The insulating sheet according to claim 3, wherein the phosphate compound contained in the component (B) is triphenyl phosphate, diphenyl tolyl phosphate, or tritolyl phosphate.

8. The insulating sheet according to claim 3, wherein the condensed phosphate compound contained in the component (C) is resorcinol bisdiphenyl phosphate or resorcinol bisdixylyl phosphate.

9. The insulating sheet according to claim 3, wherein a proportion of the component (A) is from about 20 to 85% by weight based on the total weight of the polyphenylene ether resin composition.

10. The insulating sheet according to claim 3, wherein a proportion of the component (B) is from about 1 to 50% by weight based on the total weight of the polyphenylene ether resin composition.

11. The insulating sheet according to claim 3, wherein a proportion of the component (C) is from about 1 to 50% by weight based on the total weight of the polyphenylene ether resin composition.

12. The insulating sheet according to claim 3, wherein the content of phosphorus is from about 2 to 4% by weight based on the total weight of the polyphenylene either resin composition.

* * * * *